Patented Apr. 13, 1943

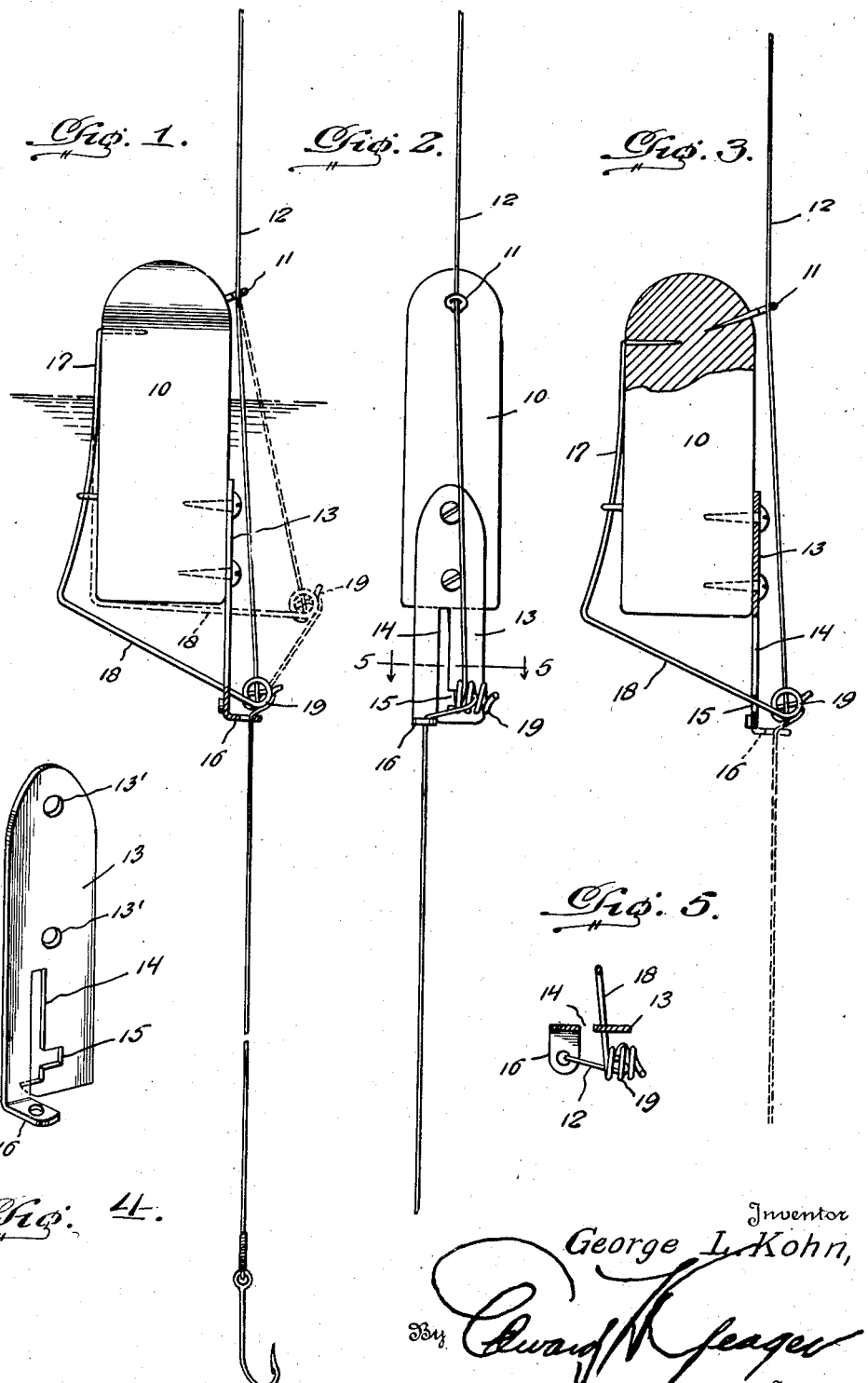

2,316,256

UNITED STATES PATENT OFFICE 2,316,256

FISHLINE FLOAT

George L. Kohn, Van Wert, Ohio

Application April 13, 1942, Serial No. 438,816

4 Claims. (Cl. 43—15)

The present invention relates generally to fish line floats or the like, and comprehends a novel construction of means whereby a quick, strong upward pull is exerted on the line instantaneously with the slightest nibbling on the bait.

It is one of the chief characteristics of the instant invention to provide a fish line float of the character above mentioned, which is constructed to exert a maximum pull on the line, within a minimum period of time, thus rendering the invention both positive and highly efficient in operation for the purpose intended.

Another important object of the invention resides in the provision of a fish line float capable of being readily and easily adjusted to occupy any desired position on the line, without the necessity of removing the float therefrom.

The nature and advantages of the invention will be better understood from the following detail description when read in connection with the accompanying drawing, the invention residing in the construction, combination and arrangement of parts as claimed.

In the drawing forming part of this application, like numerals of reference indicate similar parts in the several views, and wherein:

Figure 1 is a side elevation of the invention, showing the set position of the line actuating means in full lines, and its active position by dotted lines.

Figure 2 is a view taken at a right angle to Figure 1.

Figure 3 is a view similar to Figure 1, but partly in section.

Figure 4 is a perspective view of the bracket plate.

Figure 5 is a fragmentary detail sectional view.

Referring to the drawing in detail, 10 indicates the body of the float which may of course be constructed from any suitable material and vary in size and configuration without departing from the inventive idea. Projecting from an appropriate part of the float is a guide eye 11 through which the line 12 passes, the float being attached to the line in a manner to be presently described.

Carried by the float and projecting below the latter is a bracket plate 13 having small openings 13' to receive suitable fastening elements for securing the plate to the body of the float. This plate may vary in size and shape and be attached to the float in any suitable manner, but is essentially characterized with a longitudinally disposed L-shaped slot, the vertical branch of which is indicated at 14, while the horizontal branch is shown at 15. Carried by this bracket plate and located at one side of the slot is a line guide 16. The bracket plate cooperates with the line actuating means which functions to exert a strong upward pull on the line, instantaneously with the slightest disturbance of the line, or nibbling at the bait thereon.

In accordance with one embodiment of the invention, the line actuating means preferably consists of a resilient element including a vertical portion 17 terminally attached to one side of the float in any suitable manner, and a horizontal portion 18 received by and operating in the slot of the bracket plate 13. This horizontal portion 18 terminates in a spring coil 19 which may of course embody any desired number of convolutions. The convolutions are slightly spaced apart at the top thereof, but closely related at the bottom to provide a clamping means for the line 12. Manifestly, the line passes from the guide 16 at one side of the slot in the plate 13 through the spring coil 19 located beyond the other side of the slot, and is finally clamped between adjacent convolutions of the coil. Here it will be noted that by virtue of this construction the float can be readily and easily adjusted along the line to occupy any position thereon without necessitating the removal of the float from the line. For this purpose it is only necessary to release the line from between the convolutions of the coil, after which the line is free to slide through the coil. This adjustment is of course made to vary the length of the line from the float for depth.

In practice, the line actuating element is manually set for use by lowering the portion 18 thereof into the horizontal branch 15 of the slot as illustrated. When thus set, the line actuating element is placed under considerable tension, so that when it is released, it forcibly exerts an upward pull on the line incident to the return of the element to its normal position. The release of the element is instantaneously effected by a slight nibbling on the bait, and is very sensitive to the slightest positive disturbance of the line. As above stated, the line 12 passes from the guide 16 horizontally to the spring coil 19 so that a lateral pull is exerted on the resilient element to dislodge it from the branch 15 of the L-shaped slot, incident to the slightest disturbance of the line itself. By virtue of the fact that the line actuating element when set, is under considerable tension, it functions to exert a quick, strong pull on the line when released, thus assuring a positive action with maximum efficiency for the purpose intended.

While it is believed that from the foregoing description the nature and advantages of the invention will be readily understood, I want it known that I do not limit myself to what is herein illustrated or described, and that such changes in construction may be resorted to when desired as fall within the scope of what is claimed.

What is claimed is:

1. In a fish line float, line actuating means carried thereby and including a resilient element having a horizontally disposed portion terminating to provide a spring coil through which the line is passed and clamped thereto, spaced offset line guides mounted on the float, said horizontal portion of the element being adapted to be set under tension to be tripped incident to a nibbling on the bait, and thus exert a sudden pull on the line, and means for holding said portion of the element in its set position for use.

2. In a fish line float, a resilient element carried thereby and including a horizontal portion arranged beneath the float and terminating to provide a spring coil through which the line passes, the convolutions of the coil being slightly spaced and used as a clamp to grip the line, said float being adjustable along the line to any desired position without removal therefrom, spaced line guides carried by the float, said horizontal portion of the element being adapted to be lowered under tension and utilized to exert a sudden pull on the line, and means for holding the said portion in its lowered position until tripped by a nibbling on the bait.

3. In a fish line float, a bracket plate depending therefrom and longitudinally slotted, line actuating means carried by the float and including a resilient element having a horizontally disposed portion movable in said slot and engaged thereby to hold the portion lowered under tension, and said portion being terminally connected with said line and utilized to exert a sudden pull thereon when released from the slot incident to a nibbling on the bait, and a line guide carried by the bracket plate and located beneath and to one side of the slot.

4. In a fish line float, a bracket plate depending therefrom and having a longitudinally disposed L-shaped slot, a resilient element carried by the float and having a horizontal portion movable in the slot and engaged thereby to hold the same in a lowered position under tension, said portion terminating to provide a spring coil through which the line passes and utilized to grip the line, a line guide arranged adjacent the upper end of the float, a second line guide carried by the bracket plate at the lower end thereof and at one side of the slot, said horizontal portion operating to exert a sudden pull on the line when tripped, incident to a nibbling on the bait.

GEORGE L. KOHN.